(12) United States Patent
Donenfeld

(10) Patent No.: US 9,619,639 B2
(45) Date of Patent: Apr. 11, 2017

(54) REAL-TIME PRESENCE VERIFICATION

(71) Applicant: SAFE CODE SYSTEMS LTD., Natania (IL)

(72) Inventor: Ariel Donenfeld, Natania (IL)

(73) Assignee: SAFE CODE SYSTEMS LTD., Natania (IL)

( * ) Notice: Subject to any disclaimer, the term of this patent is extended or adjusted under 35 U.S.C. 154(b) by 0 days.

(21) Appl. No.: 15/031,293

(22) PCT Filed: Oct. 22, 2014

(86) PCT No.: PCT/IL2014/050918
§ 371 (c)(1),
(2) Date: Apr. 22, 2016

(87) PCT Pub. No.: WO2015/063759
PCT Pub. Date: May 7, 2015

(65) Prior Publication Data
US 2016/0259928 A1    Sep. 8, 2016

(30) Foreign Application Priority Data

Oct. 28, 2013 (IL) .......................................... 229115

(51) Int. Cl.
| | |
|---|---|
| *G06K 7/10* | (2006.01) |
| *G06K 7/14* | (2006.01) |
| *G06F 17/30* | (2006.01) |
| *G06Q 10/06* | (2012.01) |
| *H04W 4/02* | (2009.01) |

(Continued)

(52) U.S. Cl.
CPC ........ *G06F 21/32* (2013.01); *G06F 17/30879* (2013.01); *G06K 7/1094* (2013.01); *G06K 7/10722* (2013.01); *G06K 7/1413* (2013.01); *G06K 7/1417* (2013.01); *G06Q 10/06* (2013.01); *G07C 1/10* (2013.01); *G07C 9/00087* (2013.01); *H04W 4/02* (2013.01); *G07C 9/00103* (2013.01);
(Continued)

(58) Field of Classification Search
CPC ................ G06K 7/1094; G06K 7/1417; G06F 17/30879; G06Q 10/06; H04W 4/02
USPC ......................................... 235/376, 380, 457
See application file for complete search history.

(56) References Cited

U.S. PATENT DOCUMENTS 9,111,402 B1 * 8/2015 Krishnan ........... G07C 9/00158
2002/0175211 A1   11/2002 Dominquez et al.
(Continued)

FOREIGN PATENT DOCUMENTS

| EP | 1081659 A1 | 3/2001 |
| WO | 2005048199 A1 | 5/2005 |

*Primary Examiner* — Toan Ly
(74) *Attorney, Agent, or Firm* — The Roy Gross Law Firm, LLC; Roy Gross

(57) ABSTRACT

A method for real time presence verification, comprising: capturing a first image of a machine-readable label by a first camera of a mobile device; automatically decoding the machine-readable label to extract a reference to a database entry in response to the capturing; automatically triggering at the mobile device a capturing of a second image by a second camera of the mobile device in response to at least one of the decoding and the capturing; and automatically forwarding the second image and at least one of the first image, the database entry, and the reference to a control network node for documentation of the second image in association with the database entry.

20 Claims, 3 Drawing Sheets

(51) Int. Cl.
*G06F 21/32* (2013.01)
*G07C 1/10* (2006.01)
*G07C 9/00* (2006.01)

(52) U.S. Cl.
CPC ...... *G07C 9/00111* (2013.01); *G07C 2209/08* (2013.01)

(56) References Cited

U.S. PATENT DOCUMENTS

| | | |
|---|---|---|
| 2005/0067487 A1* | 3/2005 | Brundage ............... G06K 19/16 235/380 |
| 2006/0044141 A1 | 3/2006 | Vesikivi et al. |
| 2009/0141986 A1 | 6/2009 | Boncyk et al. |
| 2011/0313893 A1 | 12/2011 | Weik, III |
| 2012/0267432 A1* | 10/2012 | Kuttuva ............... G06Q 20/223 235/379 |
| 2013/0044233 A1 | 2/2013 | Bai |
| 2014/0196143 A1 | 7/2014 | Fliderman et al. |
| 2014/0279516 A1* | 9/2014 | Rellas ............... G06Q 30/0185 705/44 |

* cited by examiner

REAL-TIME PRESENCE VERIFICATION

FIELD AND BACKGROUND OF THE INVENTION

The present invention, in some embodiments thereof, relates to presence verification and, more particularly, but not exclusively, to real time personnel presence verification.

A wide array of customer related transactions rely on a mobile device which detects a machine-readable label in real time. For instance, in some cases, a mobile device may be used to detect a MREL attached to a pharmaceutical in order to obtain information relating to the existence or absence of allergens relevant to a customer having acute allergic reaction to a substance possibly contained in the pharmaceutical.

Mobile devices with integrated cameras are widely used as economical image-sensors and image-processing software became more readily available to the public. Such devices are manufactured with built-in cameras. Images and videos captured through the use of these mobile devices may be stored locally in the mobile device and/or persisted via application device interfaces to remote repositories and/or transmitted via a network to a remote server for further processing. The use of machine-readable label technology in real time systems has proliferated as a means for effective information identification and retrieval.

In some embodiments, machine-readable labels allow numbers, characters, and other symbols to be encoded into multi-dimensional spaced geometric shaped sequences. A mobile device with an integrated camera may then detect the machine-readable label arrangement on a product. Subsequently, an application having a decoding module decodes the encoded image, and the information gathered from the decoded image may be utilized as data and/or a message sent to a network and acted upon accordingly.

Existing methods for personnel presence verification include time clocks, biometric identification such as palm or fingerprint, fixed cameras and global positioning system (GPS) tracking.

SUMMARY OF THE INVENTION

According to some embodiments of the present invention there is provided a method for real time presence verification, comprising: capturing a first image of a machine-readable label by a first camera of a mobile device; automatically decoding the machine-readable label to extract a reference to a database entry in response to the capturing; automatically triggering at the mobile device a capturing of a second image by a second camera of the mobile device in response to at least one of the decoding and the capturing; and automatically forwarding the second image and at least one of the first image, the database entry, and the reference to a control network node for documentation of the second image in association with the database entry.

Optionally, the database entry is a geographic location where the machine-readable label is located.

More optionally, the documentation is based on documenting the second image and the geographic location together with a time stamp of a current time to indicate a time of visit of a user carrying the mobile device at the geographic location.

Optionally, the decoding comprises: detecting a holographic image in the machine-readable label, the holographic image encrypts the machine-readable label; and decrypting, using a key, the holographic image.

Optionally, the decoding further comprises: in response to the decrypting, reading the machine-readable label; and decoding an identification encoded in the machine-readable label.

Optionally, the method further comprises receiving at the mobile device, in response to the forwarding, data related to the database entry from the control network node.

More optionally, the method further comprises presenting the data related to the database entry on a display of the mobile device.

Optionally, the method further comprises filling, by a user of the mobile device, a report including information associated with the database entry.

More optionally, the method further comprises sending the report to the control network node for documentation in association with the database entry.

Optionally, the machine-readable label is a barcode.

Optionally, the machine-readable label is a quick response code (QR).

Optionally, the mobile device is a mobile phone.

Optionally, the mobile device is a tablet computer. Optionally, the mobile device is smart glasses and the second image images at least one eye of a retina and an iris of a user of the smart glasses.

Optionally, the first camera of the mobile device and second camera of the mobile device are mounted on opposing surfaces to image separately and receptively first and second environments located in front and behind the mobile device.

Optionally, the second image is a facial image that images at least part of a face of a user of the mobile device.

More optionally, the method further comprises identifying the user from the second image by using a facial recognition system and documenting the user identification together with a time stamp of a current time to indicate a visit of the user at a location of the machine-readable label during the current time.

Optionally, the capturing of the second image is performed within a time of 5 seconds from the capturing of the first image.

Optionally, the capturing of the second image is performed within a time of 1 second from the capturing of the first image.

According to some embodiments of the present invention there is provided a system for real time presence verification, comprising: a database storing a plurality of entries, each one of the plurality of entries is associated with a machine-readable label; a client module installed in a mobile device having a first camera and a second camera, the client module triggers at the mobile device a capturing of a second image by the second camera of the mobile device in response to a capturing of a first image of a machine-readable label by the first camera of the mobile device; and a control network node which receives the second image, the at least one of the first image and the database entry from the mobile device for documentation of the second image in association with the machine-readable label.

According to some embodiments of the present invention there is provided a mobile device comprising: at least two cameras, at least one processor; and at least one memory including computer program code for at least one program, the at least one program, using the at least one memory and the at least one processor, to: trigger a capturing of a second image by a second camera of the mobile device in response to a capturing of a first image of a machine-readable label by a first camera of the mobile device; and forward the second image to a control network node for documentation in association with the machine-readable label.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
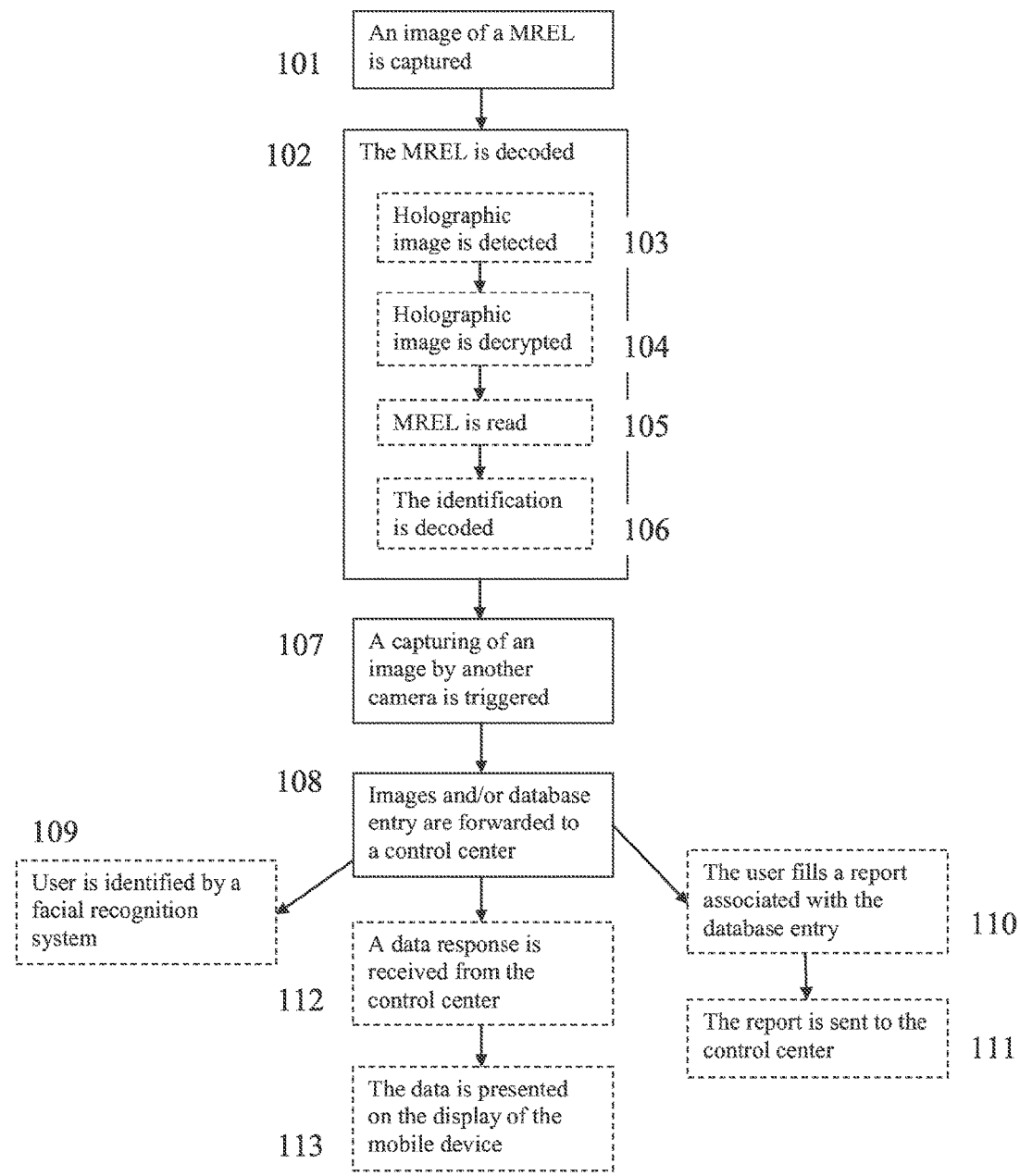
FIG. 1 is a flowchart schematically representing a method for real time personnel presence verification, according to some embodiments of the present invention.

The present invention, in some embodiments thereof, relates to presence verification and, more particularly, but not exclusively, to real time personnel presence verification.

According to some embodiments of the present invention, there are provided methods and systems for real time presence verification, for instance personnel presence verification, based on facial image(s) captured during an electronic reading of machine-readable label(s). The methods includes associating a machine-readable label with a database entry, such as a geographic location and/or object identifier; identifying a capturing of an image of the machine-readable label by primary camera of a mobile device, for instance a rear camera; triggering a capture of a second image by opposing camera of the mobile device, such as the front camera, and forwarding any of the images and/or the database entry to a control network node for documentation, in association with the machine-readable label and/or the database entry.

Some embodiments of the present invention may be used to confirm the presence of working personnel at specific location, such as houses a technician has to visit, restaurants and food manufacturing facilities that has to be visited by health or religion food inspectors, shelves at a storage facility that workers has to check regularly or inspection points that has to be scanned by security personnel.

Some embodiments of the present invention may also be used to identify customers, for example, when a customer captures an image of QR code for receiving a non transferable coupon specifically associated with the customer.

A machine-readable label sticker that is put in a desired is captured by a camera of an employee's mobile device. The sticker may be made of a holographic foil paper, so that each image of the machine-readable label is different and the sticker is difficult to forge. The capturing triggers a second camera to capture the employee's face. This method allows the company that employs the employee to track his whereabouts during work time, and also be used as a time clock at the begging and end of a shift, to assist in tracking the hours worked by the employee.

The methods and systems of the present invention are less expansive for a company then currently used methods for personnel presence verification, such as biometric identification or fixed cameras.

The method of the present invention also avoids existing problems of GPS tracking, such as privacy issues concerning the use of an employee's personal phone's GPS, reception problems in roofed areas and/or GPS position inaccuracy.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to the drawings, FIG. 1 is a flowchart schematically representing a method for real time personnel presence verification, according to some embodiments of the present invention.

First, as shown at 101, an image of a machine-readable label is captured by a camera of a mobile device is identified. A machine-readable label may be, for example, a barcode, a holographic label, a quick response code (QR) or any type of linear, matrix and/or other encoded label. The database entry may be a geographic location, a product, a person's name or any other data type.

As used herein, machine-readable label refers to a type of a visually coded graphic symbol and/or barcode and/or an image containing data that encodes information detected using a mobile device integrated with a camera. The mobile device may be used to detect and/or view the visually coded image and/or to extract data contained in it. The machine-readable label may be decoded by a decoding module residing on the mobile device, in order to provide information such as text and/or email and/or websites and/or phone numbers and/or other information encoded within the machine-readable label.

Optionally, the database entry is a geographic location where the machine-readable label is located. In this case, a database contains a geographic location for each machine-readable label. The machine-readable label may be printed on a sticker, a board, a plate or any other surface. Optionally, the machine-readable label is printed on sticker of a type that cannot be removed without damaging the sticker. Optionally, the sticker is made of a material that is difficult to forge, such as holographic foil paper.

The mobile device may be a mobile phone, a tablet computer, smart glasses or any other wearable and/or handheld device having more than one camera. For example, an employee inspecting inventory captures a QR printed on a merchandise storage unit to indicate the inventory was inspected, or a client of a shop scanning a machine-readable label printed on an advertisement.

Figure 2:
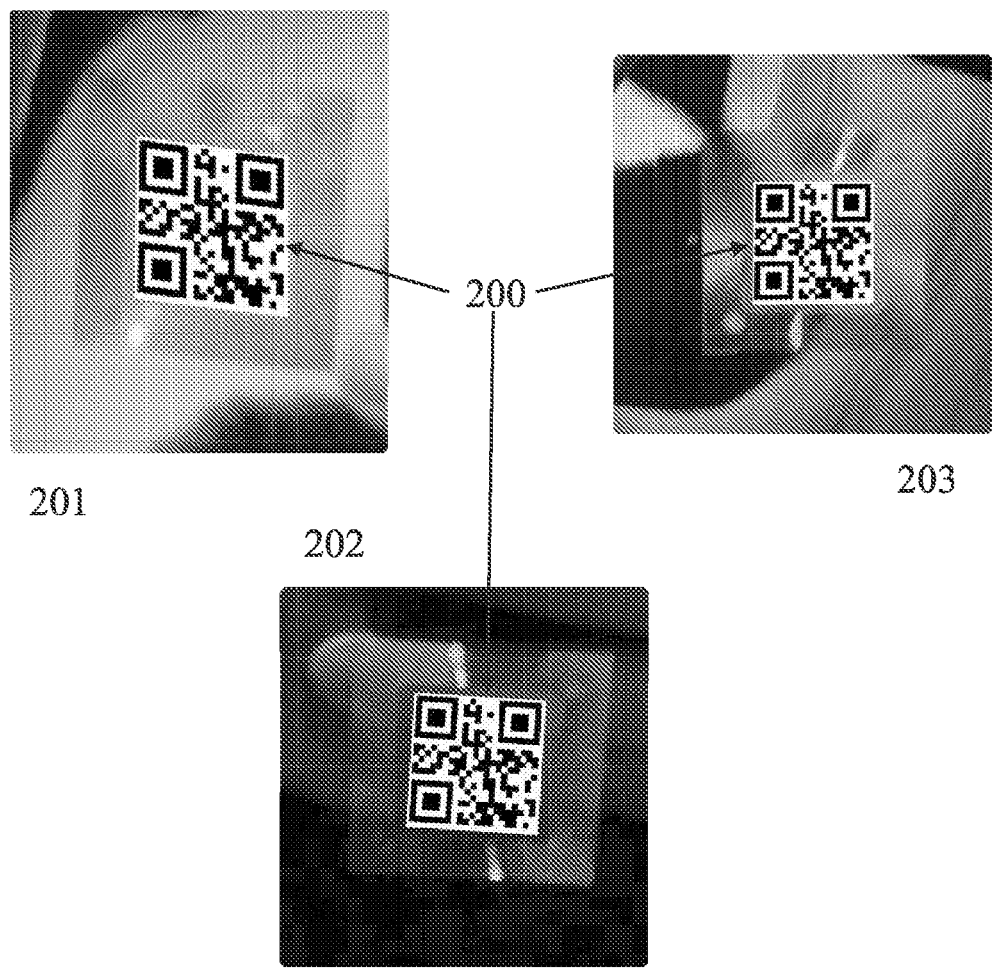
FIG. 2 is an exemplary machine-readable label printed on a holographic foil paper, according to some embodiments of the present invention.

Optionally, the machine-readable label is manufactured so every image of the machine-readable label is different, for example, printed on a holographic foil paper. Reference is now made to FIG. 2, which is an exemplary machine-readable label 200 printed on a holographic foil paper, according to some embodiments of the present invention. Images 202-204 are images of machine-readable label 200, each having different coloring surrounding machine-readable label 200.

Then, as shown at 102, the machine-readable label is automatically decoded to extract a reference to a database entry in response to the capturing of the image of the machine-readable label. The reference may be, for example, a unique identifier and/or link. The machine-readable label may be encoded by a holographic encryption. Optionally, when holographic image encrypts the machine-readable label, the holographic image is detected as shown at 103 and decrypted by a key as shown at 104. Optionally, the machine-readable label is then read as shown at 105 and the identification is decoded as shown at 106.

Then, as shown at 107, a capturing of an image by another camera of the mobile device is automatically triggered in response the capturing of the image of the machine-readable label or to the decoding of the machine-readable label.

Optionally, the cameras of the mobile device are mounted on opposing surfaces of the mobile device. For example, on a mobile phone or a tablet computer, the capturing of the image of the machine-readable label is done by the rear camera of the device, and a capturing by the front camera of the device is triggered. Optionally, the image taken by the front camera is a facial image of at least part of the face of a user of the mobile device.

Optionally, the mobile device is smart glasses and the capturing of the image of the machine-readable label is done by a forward looking camera of the glasses. Optionally, the triggered capturing is done by a backward looking camera, taking an image of an eye's retina and/or iris of the user wearing the glasses.

Then, as shown at 108, the triggered image and the image of the machine-readable label, the database entry and/or the reference, are automatically forwarded to a control network node for documentation of the triggered image in association with the database entry. The control network node may be, for example, a remote server also having a database of machine-readable labels and associated database entries. The forwarding may be performed immediately after the capturing of the images, or may be performed at a later time, for example, when the reception of the mobile device is temporarily insufficient.

Optionally, an image comparison system is used to compare the image of the machine-readable label and/or the triggered image to previously captured images stored in the control network node. This is used to identify forgery of duplication of older images.

Optionally, when the database entry is a geographic location where the machine-readable label is located, the documentation is based on documenting the triggered image and the geographic location, together with a time stamp of a current time to indicate that the user carrying the mobile device visited at the location of the machine-readable label during the current time. The time stamp may be embedded in at least one of the images or be recorded as a separate entry.

Optionally, as shown at 109, when the image taken by the front camera is a facial image, the user is identified from the facial image by using a facial recognition system. Any known or new facial recognition system may be used. The identification of the user is then documented, together with a time stamp of a current time to indicate that the user carrying the mobile device visited at the location of the machine-readable label during the current time. For example, an employee's face is captured to indicate that no other person is using the mobile device.

Optionally, as shown at 110, the user fills a report associated with the database entry. For example, a technician regularly performing maintenance to machinery may capture an image of a machine-readable label attached to a machine, with his tablet computer, than fill a report about the machine's condition on the tablet computer.

Optionally, as shown at 111, the report is sent to the control network node for documentation, in association with the database entry, the time stamp and/or any of the images.

Optionally, as shown at 112, a response is received from the control network node in response to forwarding the image of the machine-readable label, the triggered image and/or the database entry. The response contains data related to the database entry. For example, a confirmation of the employee's presence verification is received by the employee's mobile device from the server.

Optionally, as shown at 113, the data related to the database entry is presented on the display of the mobile device. For example, additional information about an item related to the machine-readable label is presented to the employee.

Figure 3:
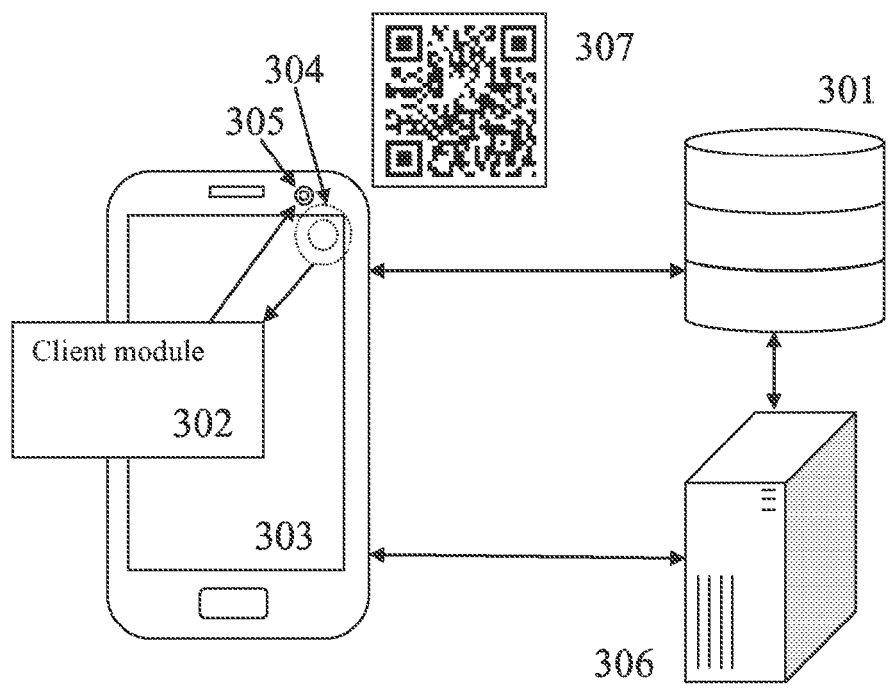
FIG. 3 is a schematic illustration of a system for real time personnel presence verification, according to some embodiments of the present invention.

Reference is now made to FIG. 3 which is a schematic illustration of a system for real time personnel presence verification, according to some embodiments of the present invention.

The system contains a database 301 that stores entries, such as geographic location, each one of the entries is associated with a machine-readable label. One of the entries in database 301 is machine-readable label 307. The system also contains a client module 302 installed in a mobile device 303. Mobile device 303 has a rear camera 304 and a front camera 305. The system also contains a control server 306.

Client module 302 triggers a capturing of an image by front camera 305 of mobile device 303 in response to a capturing of an image of a machine-readable label 307 by rear camera 304 of mobile device 303. Control server 306 then receives both images and the geographic location from mobile device 303 for documentation in association with machine-readable label 307.

Figure 4:
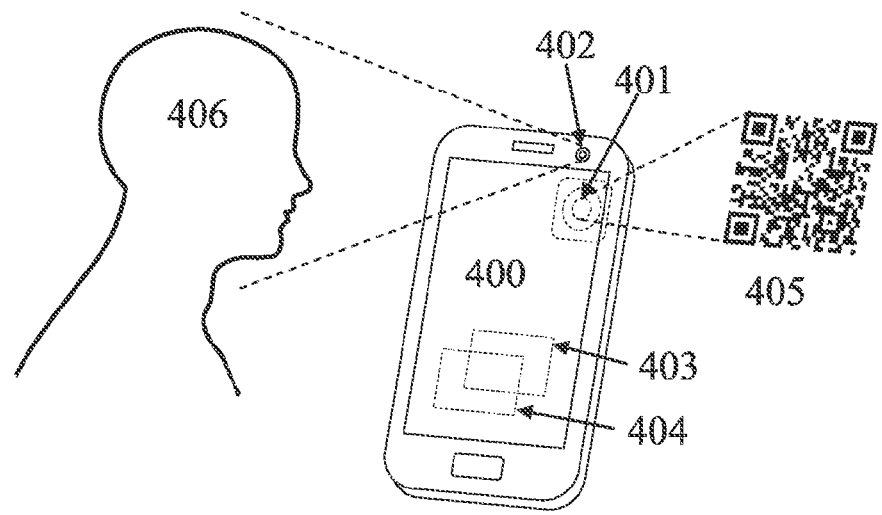
FIG. 4 is a schematic illustration of an exemplary mobile device capturing an exemplary machine-readable label in response to instructions from an exemplary user, according to some embodiments of the present invention.

Reference is now made to FIG. 4 which is a schematic illustration of an exemplary mobile device capturing an exemplary machine-readable label in response to instructions from an exemplary user, according to some embodiments of the present invention. Mobile device 400 includes a rear camera 401 and a front camera 402. Mobile device 400 also includes processor 403 and memory 404. Memory 404 includes computer program code for a program. The program, using processor 403 and memory 404, triggers a capturing of an image by front camera 402 of mobile device 400 in response to a capturing of an image of machine-readable label 405 by rear camera 401 of mobile device 400. Optionally, the image captured by front camera 402 is a facial image of user 406 that uses mobile device 400. The program may forward one or both of the images to a control network node for documentation in association with machine-readable label 405.

In an exemplary scenario of using real time personnel presence verification, according to some embodiments of the present invention, a company having large inventory storage uses the method. The company installs holographic stickers with embedded QR codes on storage units and shelves, and maintains a database of QR codes and the corresponding locations of the storage units and shelves. Every employee of the company that is responsible for inventory inspections is provided with a mobile app to install on his personal mobile phone. When an employee performs a necessary inspection in a storage unit, he captures an image of the QR code sticker attached to the unit, using his mobile phone. The mobile app installed on the employee's mobile phone triggers a capturing of a facial image of the employee using the mobile phone's front camera. The images are than sent to a main server of the company. The facial image is analyzed using a facial recognition system to confirm the employee's identity. The image of the QR code is then compared to previous images of the same QR code, to ensure the image was not duplicated. A confirmation of the employee's presence verification is sent to the employee's mobile phone and presented on the mobile phone's display.

In another exemplary scenario of using real time personnel presence verification, according to some embodiments of the present invention, the presence of an employee using smart glasses at his workplace is verified. As the employee enters his workplace, he captures an image of a QR codes embedded in the door of the workplace, using a forward camera of the smart glasses. A capturing of an iris image of the employee's eye is triggered. The images are sent to a central server to indicate the employee's presence.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems for presence verification will be developed and the scope of the term presence verification is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for real time presence verification, comprising:
   capturing a first image of a machine-readable label by a first camera of a mobile device;
   automatically decoding said machine-readable label to extract a reference to a database entry in response to said capturing;
   automatically triggering at said mobile device a capturing of a second image by a second camera of said mobile device in response to at least one of said decoding and said capturing; and
   automatically forwarding said second image and at least one of said first image, said database entry, and said reference to a control network node for documentation of said second image in association with said database entry.

2. The method of claim 1, wherein said database entry is a geographic location where said machine-readable label is located.

3. The method of claim 2, wherein said documentation is based on documenting said second image and said geographic location together with a time stamp of a current time to indicate a time of visit of a user carrying said mobile device at said geographic location.

4. The method of claim 1, wherein said decoding comprises:
   detecting a holographic image in said machine-readable label, said holographic image encrypts said machine-readable label; and
   decrypting, using a key, said holographic image.

5. The method of claim 4, wherein said decoding further comprises:
   in response to said decrypting, reading said machine-readable label; and decoding an identification encoded in said machine-readable label.

6. The method of claim 1, further comprising:
   receiving at said mobile device, in response to said forwarding, data related to said database entry from said control network node.

7. The method of claim 6, further comprising:
   presenting said data related to said database entry on a display of said mobile device.

8. The method of claim 1, further comprising:
   filling, by a user of said mobile device, a report including information associated with said database entry.

9. The method of claim 8, further comprising:
   sending said report to said control network node for documentation in association with said database entry.

10. The method of claim 1, wherein said machine-readable label is a barcode.

11. The method of claim 1, wherein said machine-readable label is a quick response code (QR).

12. The method of claim 1, wherein said mobile device is a mobile phone.

13. The method of claim 1, wherein said mobile device is a tablet computer.

14. The method of claim 1, wherein said mobile device is smart glasses and said second image images at least one eye of a retina and an iris of a user of said smart glasses.

15. The method of claim 1, wherein said first camera of said mobile device and second camera of said mobile device are mounted on opposing surfaces to image separately and receptively first and second environments located in front and behind said mobile device.

16. The method of claim 1, wherein said second image is a facial image that images at least part of a face of a user of said mobile device.

17. The method of claim 16, further comprising:
   identifying said user from said second image by using a facial recognition system and documenting said user identification together with a time stamp of a current time to indicate a visit of said user at a location of said machine-readable label during said current time.

18. The method of claim 1, wherein said capturing of said second image is performed within a time of 5 seconds from said capturing of said first image.

19. The method of claim 1, wherein said capturing of said second image is performed within a time of 1 second from said capturing of said first image.

20. A system for real time presence verification, comprising:
   a database storing a plurality of entries, each one of said plurality of entries is associated with a machine-readable label;
   a client module installed in a mobile device having a first camera and a second camera, said client module triggers at said mobile device a capturing of a second image by said second camera of said mobile device in response to a capturing of a first image of a machine-readable label by said first camera of said mobile device; and
   a control network node which receives said second image, said at least one of said first image and said database entry from said mobile device for documentation of said second image in association with said machine-readable label.

* * * * *